Nov. 8, 1932.  W. F. NEWHOUSE  1,886,971
CARTON STAPLING MACHINE
Filed July 29, 1929   9 Sheets-Sheet 1
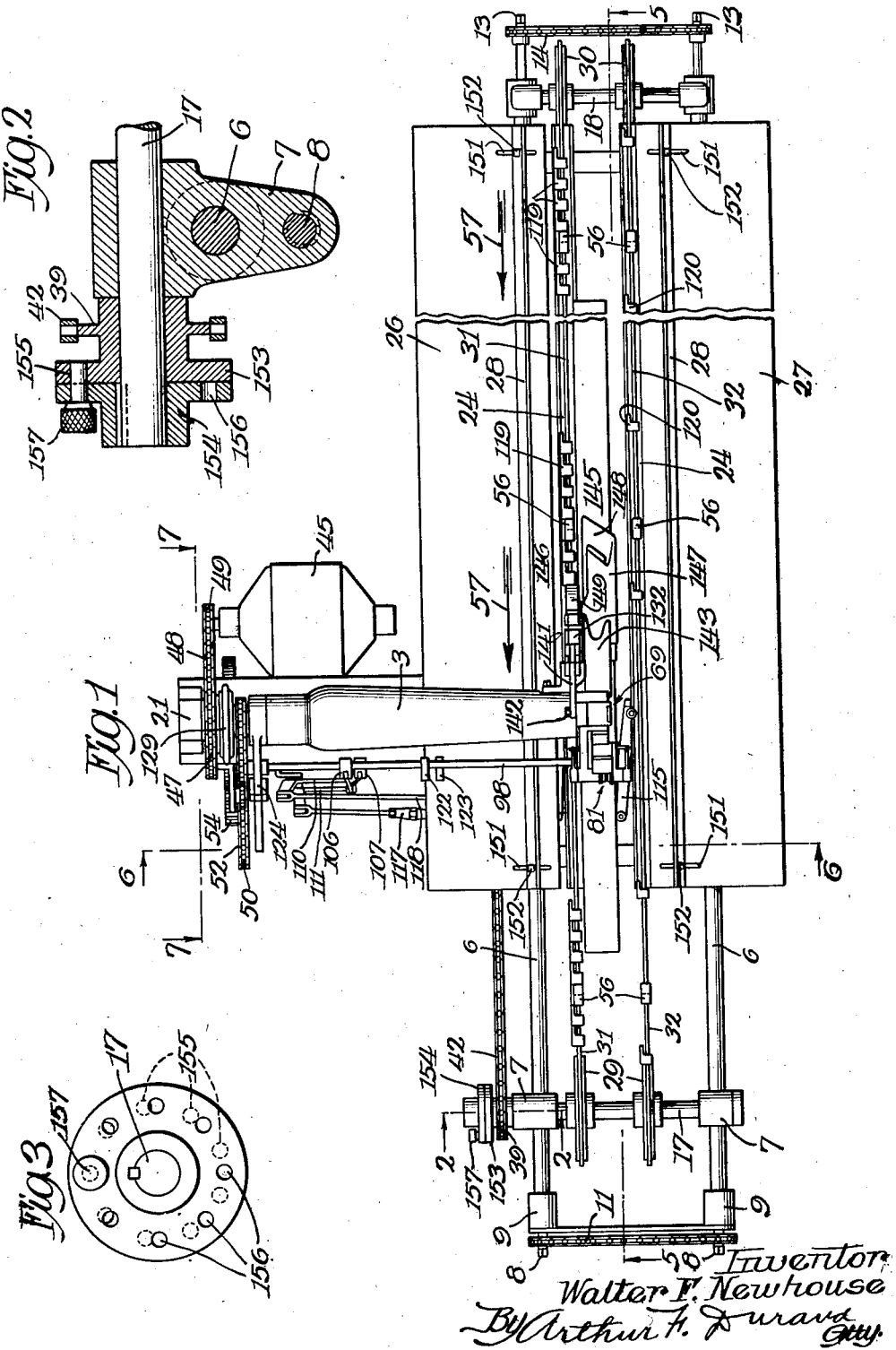
Inventor
Walter F. Newhouse
By Arthur F. Durand
Atty.

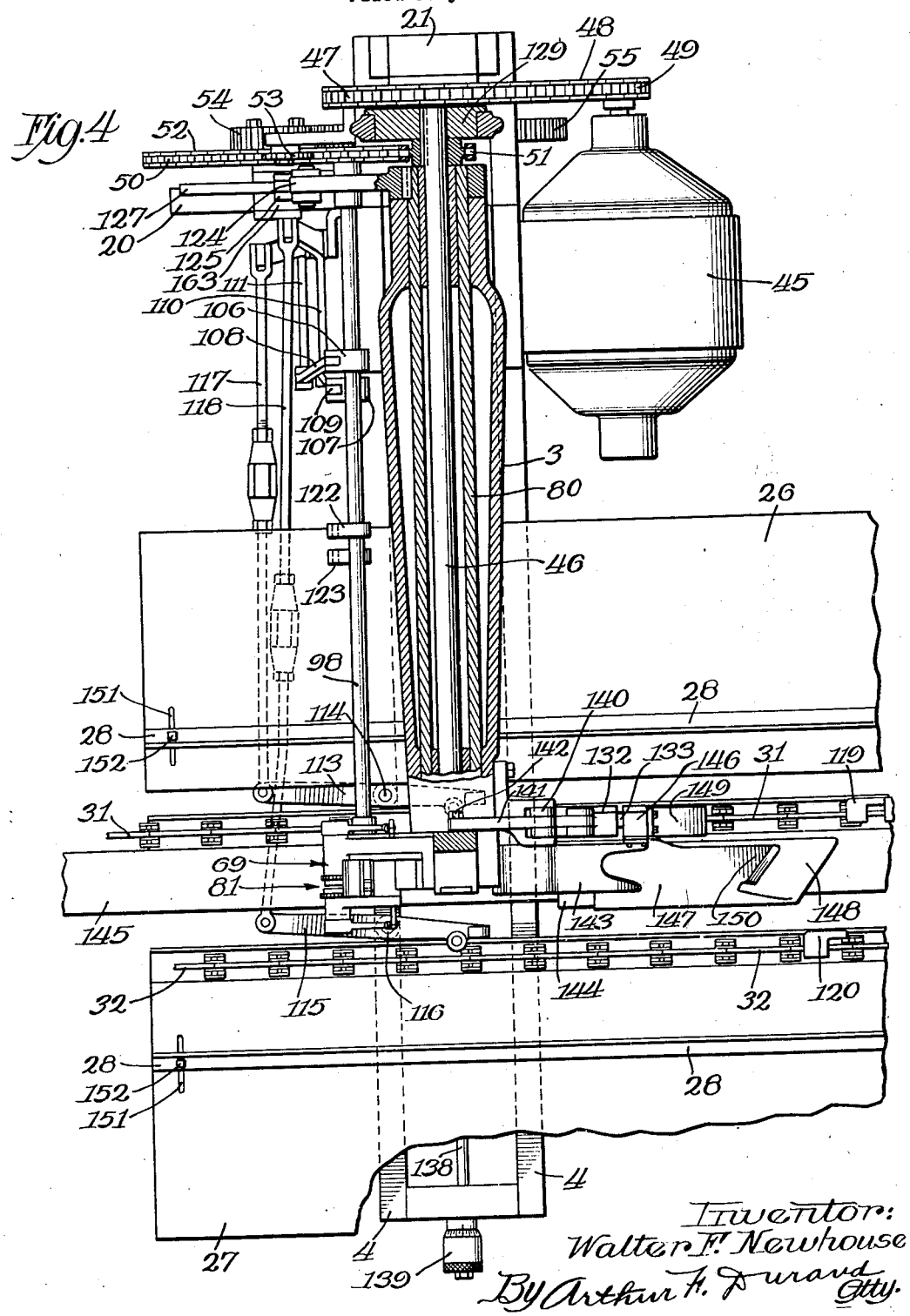

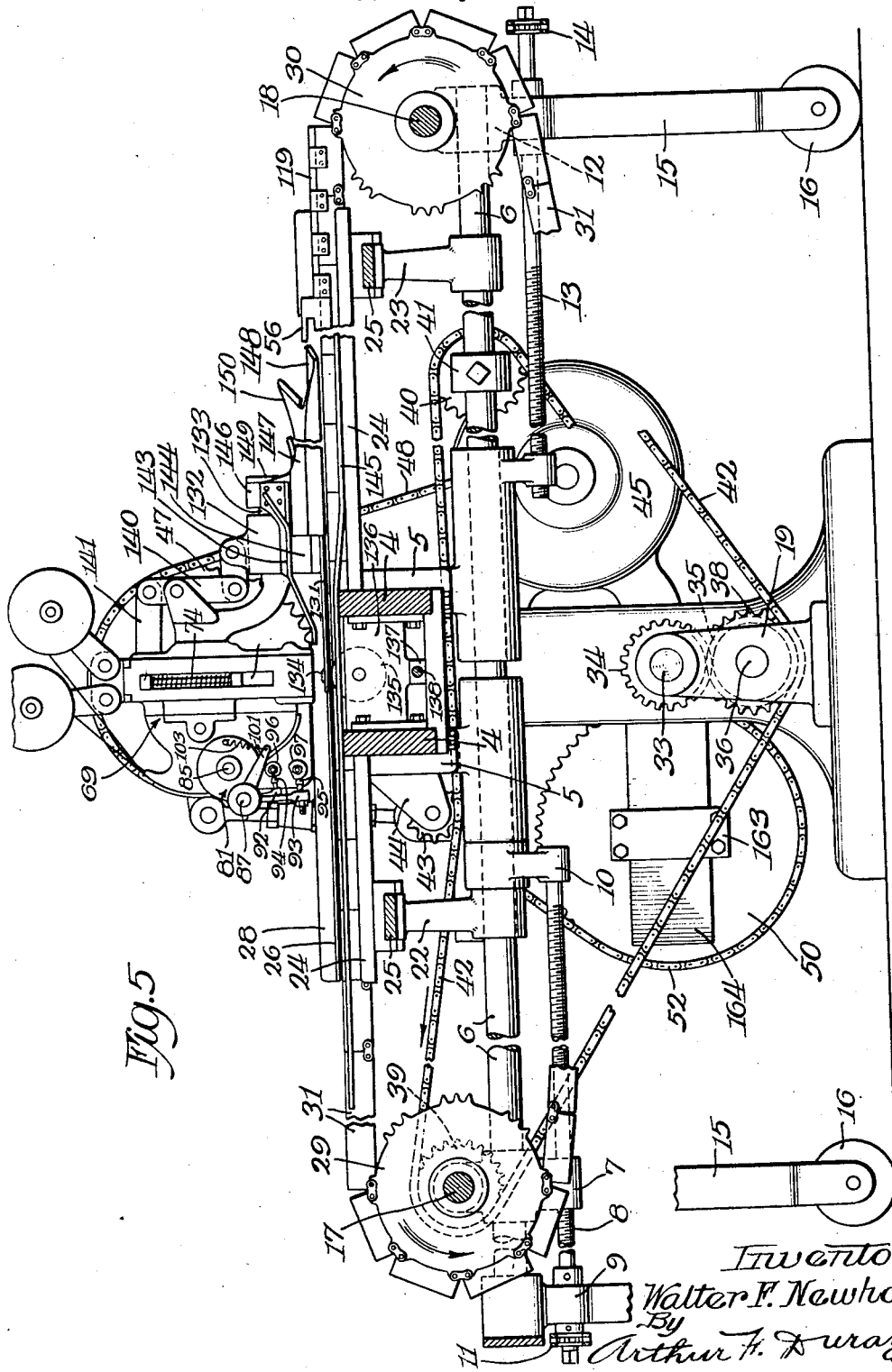

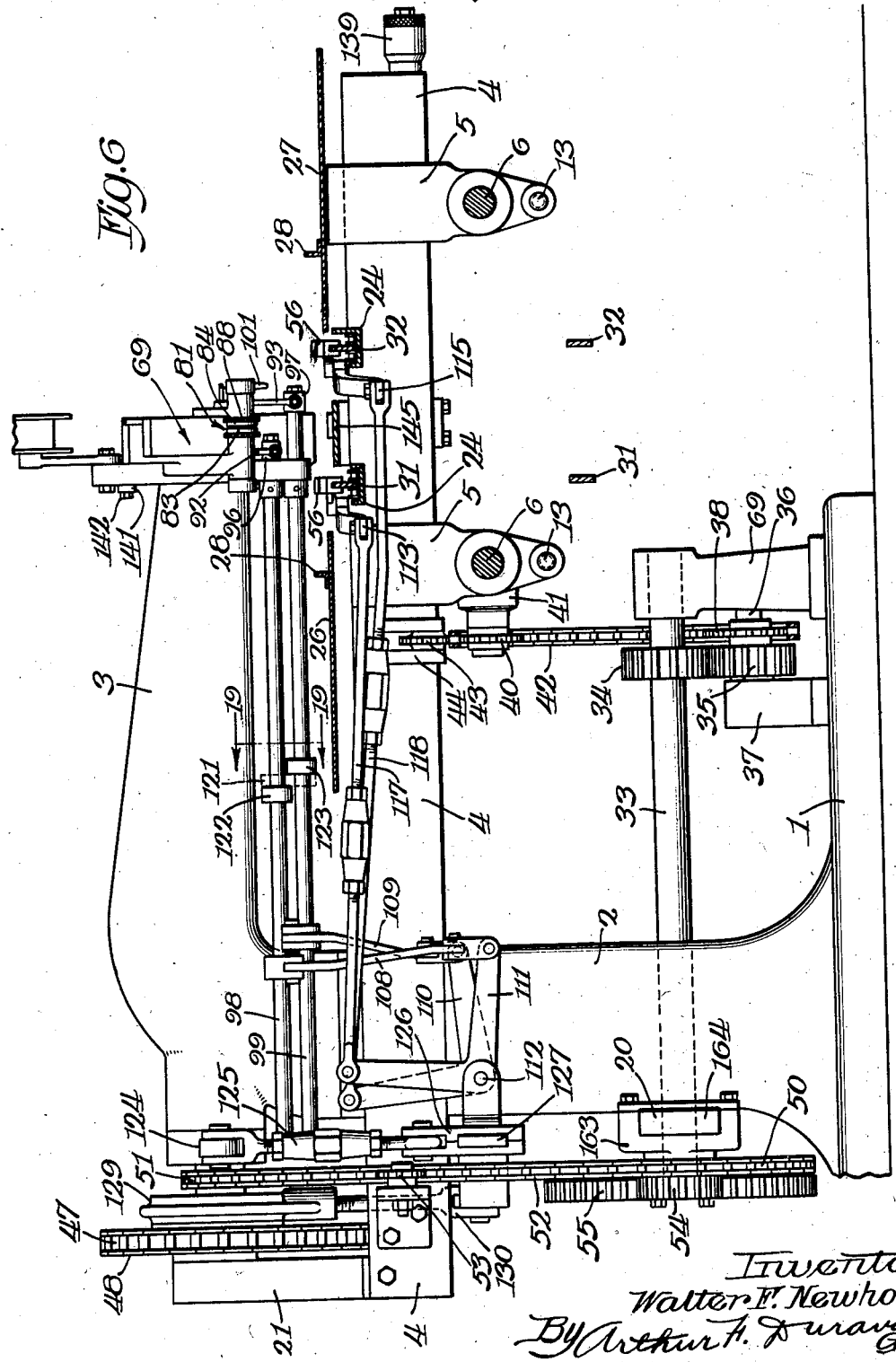

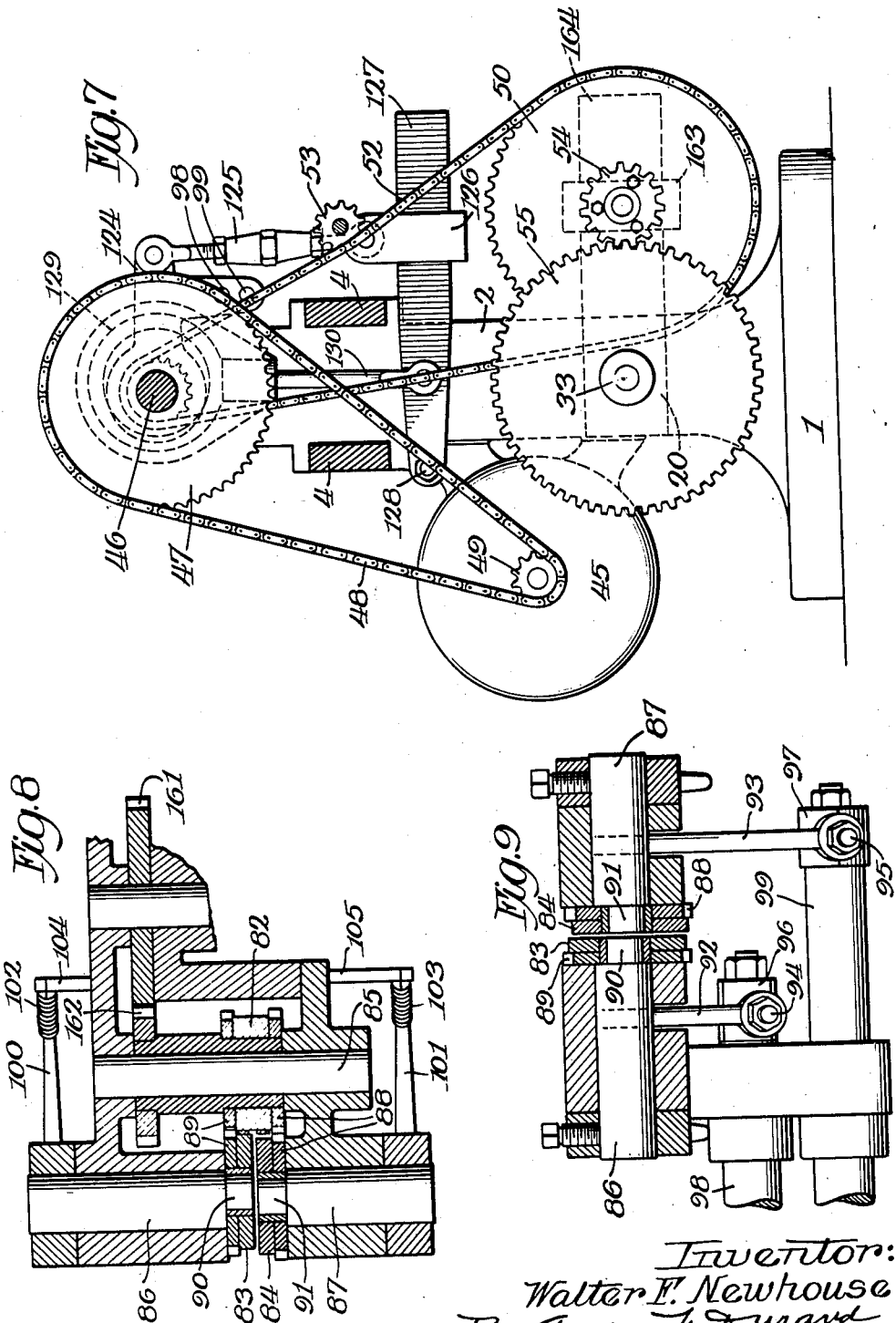

Nov. 8, 1932.  W. F. NEWHOUSE  1,886,971
CARTON STAPLING MACHINE
Filed July 29, 1929   9 Sheets-Sheet 6
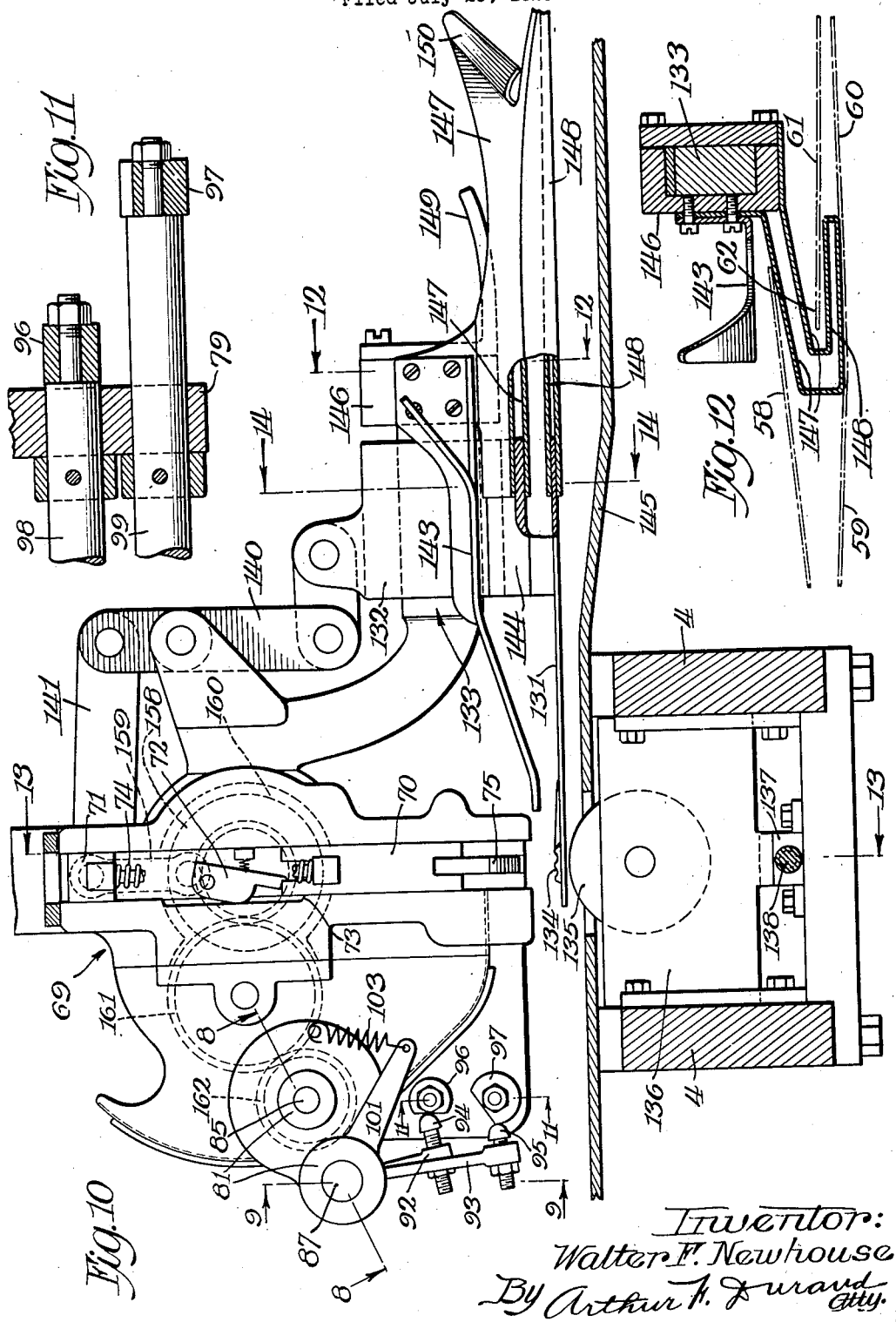
Inventor:
Walter F. Newhouse
By Arthur H. Durand
Atty.

Nov. 8, 1932.  W. F. NEWHOUSE  1,886,971
CARTON STAPLING MACHINE
Filed July 29, 1929  9 Sheets-Sheet 7
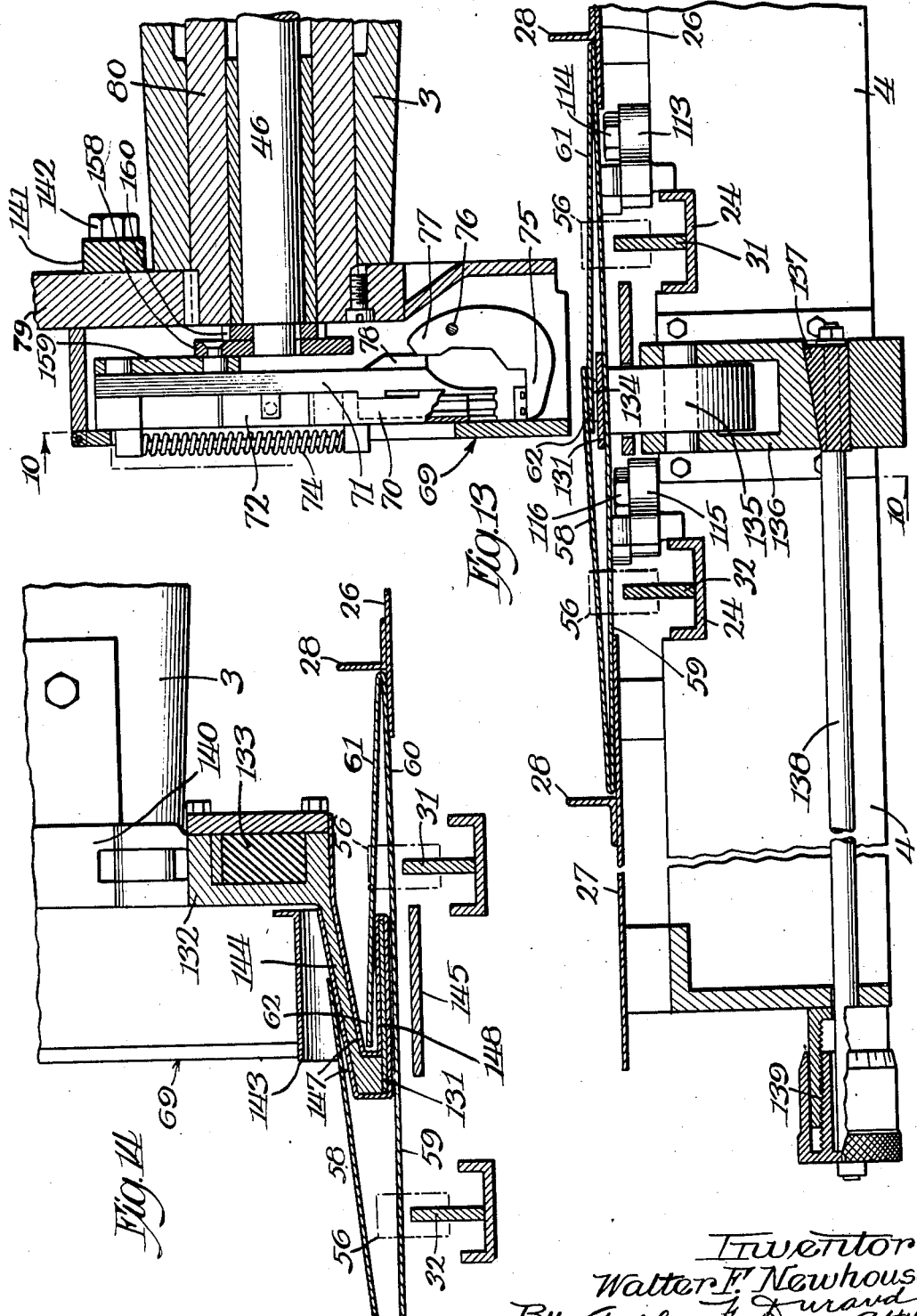
Inventor
Walter F. Newhouse
By Arthur H. Durand
Atty.

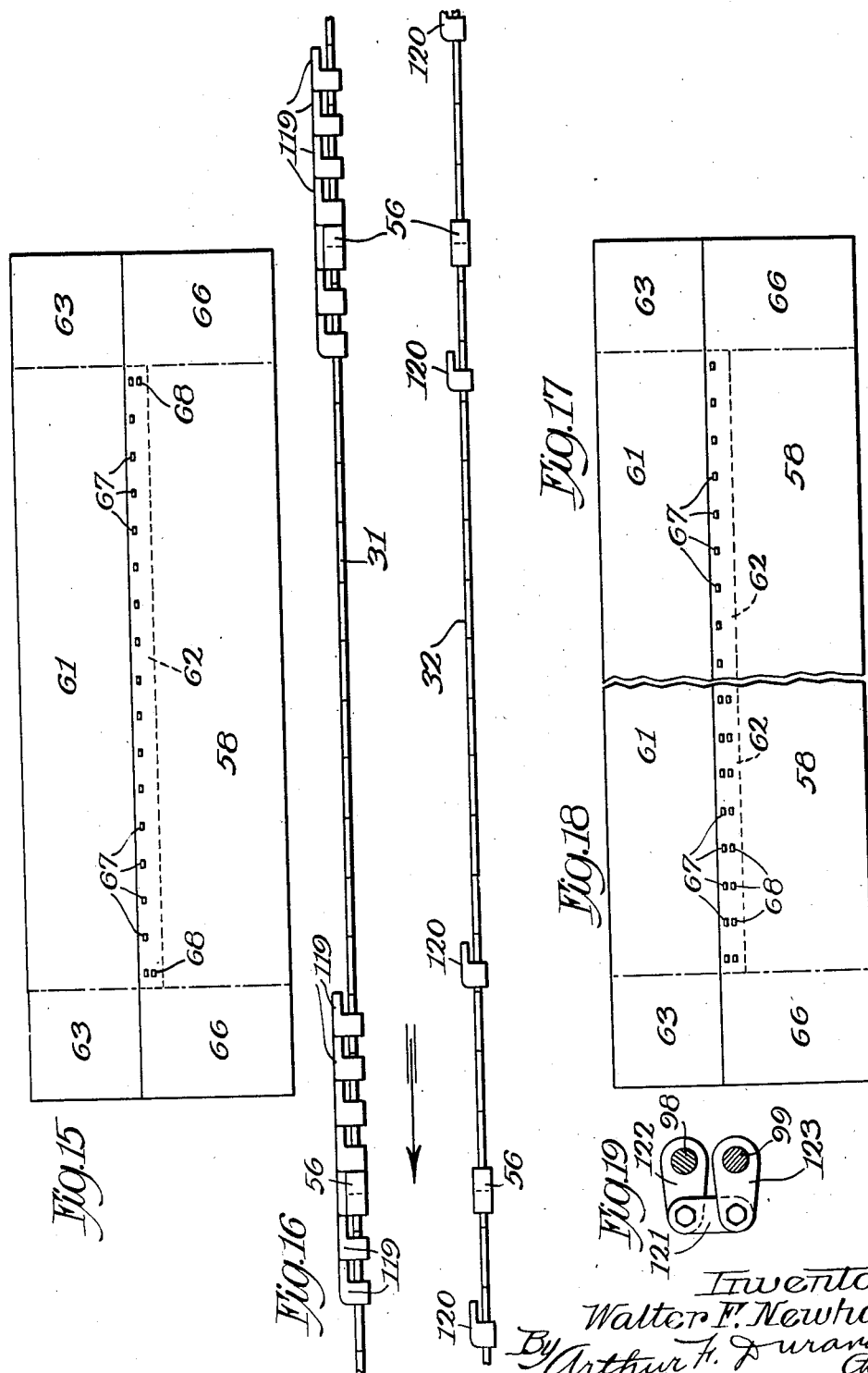

Nov. 8, 1932. W. F. NEWHOUSE 1,886,971
CARTON STAPLING MACHINE
Filed July 29, 1929 9 Sheets-Sheet 9
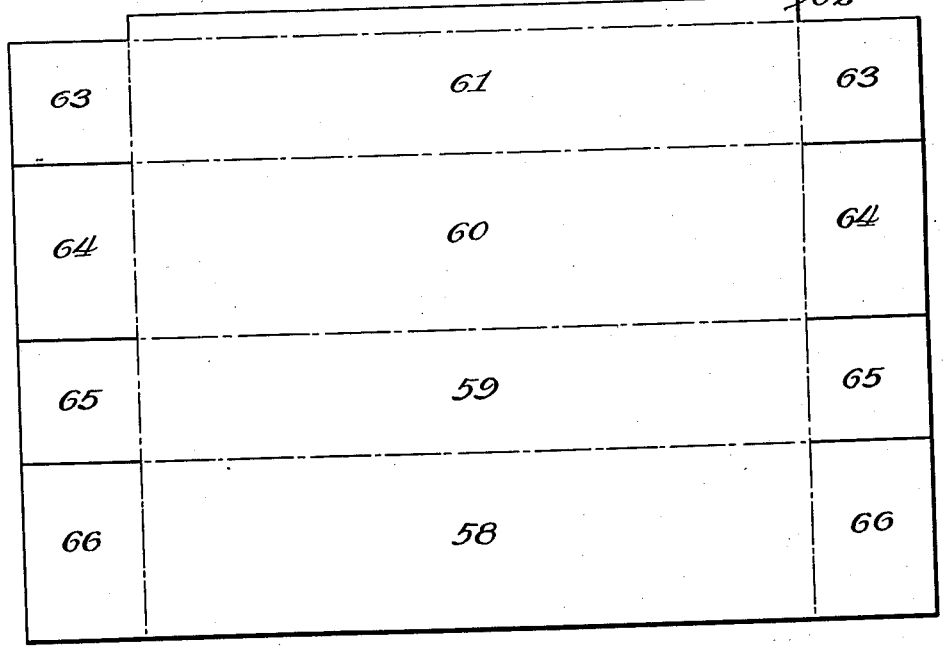
Fig.20
Fig.21
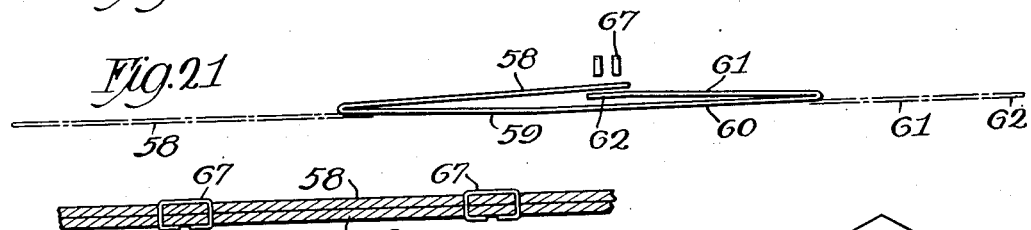
Fig.23
Fig.22
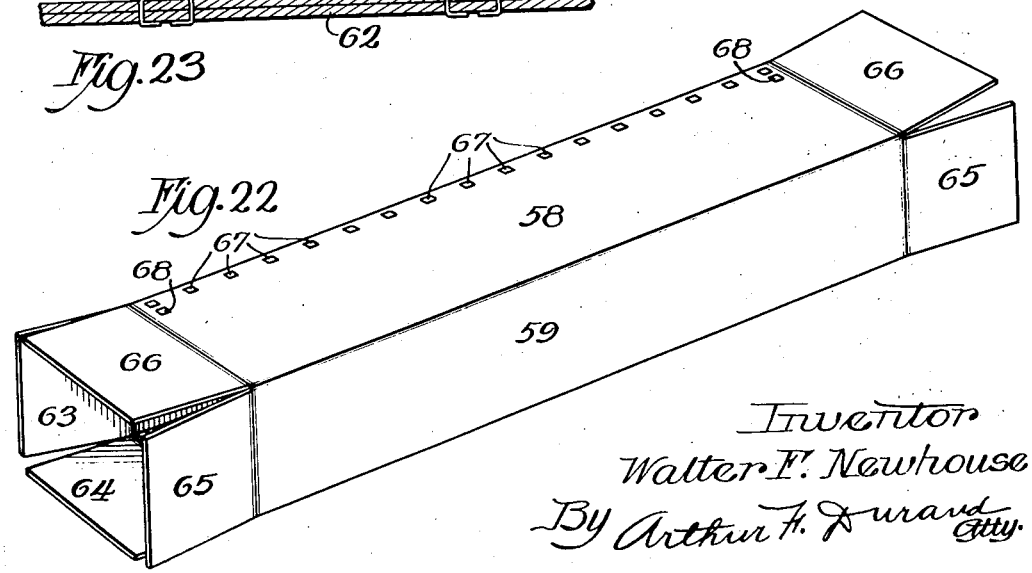
Inventor
Walter F. Newhouse
By Arthur F. Durand
Atty.

Patented Nov. 8, 1932

1,886,971

UNITED STATES PATENT OFFICE

WALTER F. NEWHOUSE, OF BENTON HARBOR, MICHIGAN, ASSIGNOR TO SARANAC AUTOMATIC MACHINE CORPORATION, OF BENTON HARBOR, MICHIGAN, A CORPORATION OF DELAWARE

CARTON STAPLING MACHINE

Application filed July 29, 1929. Serial No. 382,023.

This invention relates to machinery for making cartons, more particularly cartons made of pulpboard or fiberboard, from a blank having the edge portions thereof stapled together longitudinally of the carton, leaving the flaps at the opposite ends of the carton open.

Generally stated, the object of the invention is to provide a carton machine of this kind, in which means are provided for automatically feeding the blanks successively into position to be acted upon by the stapling mechanism, whereby the blanks enter the machine at one end thereof, travel forward in spaced relation and are discharged from the other end of the machine in the form of cartons rectangular in cross section and having their ends left open.

It is also an object to provide certain details and features of construction and combinations tending to increase the general efficiency and desirability of a carton machine of this particular character.

To these and other ends, the invention consists in matters hereinafter set forth and claimed and shown in the accompanying drawings, in which—

Fig. 1 is a plan of a carton machine embodying the principles of the invention;

Fig. 2 is an enlarged detail section on line 2—2 in Fig. 1;

Fig. 3 is an end elevation of the parts shown in Fig. 2;

Fig. 4 is an enlarged plan view of a portion of the machine shown in Fig. 1, with certain portions thereof shown in longitudinal section;

Fig. 5 is a longitudinal section on line 5—5 in Fig. 1;

Fig. 6 is an enlarged transverse vertical section on line 6—6 in Fig. 1;

Fig. 7 is an enlarged longitudinal section on line 7—7 in Fig. 1;

Fig. 8 is an enlarged detail section on line 8—8 in Fig. 10;

Fig. 9 is an enlarged detail section on line 9—9 in Fig. 10;

Fig. 10 is a longitudinal section on line 10—10 in Fig. 13;

Fig. 11 is an enlarged vertical section on line 11—11 in Fig. 10;

Fig. 12 is a vertical section on line 12—12 in Fig. 10;

Fig. 13 is a vertical section on line 13—13 in Fig. 10;

Fig. 14 is a vertical section on line 14—14 in Fig. 10;

Fig. 15 is a plan of one of the cartons in stapled condition, showing the same pressed or crushed down flat in collapsed condition;

Fig. 16 is an enlarged plan view of portions of the two feed chains or link belts showing the different blocks thereon, to be hereinafter described;

Fig. 17 is a fragmentary view of one end portion of a stapled carton, similar to Fig. 15, showing a different method of stapling the carton;

Fig. 18 is a similar fragmentary view, showing still a different method of stapling the carton;

Fig. 19 is an enlarged detail sectional view on line 19—19 in Fig. 6.

Fig. 20 is a plan of one of the blanks from which the cartons are made;

Fig. 21 is an end elevation of one of said blanks in folded condition, ready to receive the staples;

Fig. 22 is a perspective of one of the partially completed cartons made by the said machine; and Fig. 23 is a detail sectional view of the box or carton, through the overlapping portions thereof, showing the manner in which the staples are inserted.

As thus illustrated, the invention comprises a base 1 having an upright pedestal 2, provided at its upper end with a horizontally disposed arm 3 overhanging the horizontal path of travel of the carton blanks, as will hereinafter more fully appear. Parallel bars 4 are suitably secured to the upper portion of the pedestal 2, in position to extend transversely of the machine below the arm 3, and immediately below the said horizontal plane or path of travel of the carton blanks as they are fed through the machine below the stapling position, thereby to successively receive staples in each blank, after the latter is partially folded, as will hereinafter more fully appear. Brackets 5 are suitably hung on the bars 4, and these brackets support the round, parallel and longitudinally disposed frame-bars 6 in the manner shown, and on these round bars, at or adjacent the ends thereof, are mounted the bearing brackets 7, at one end of the machine, these brackets being adjustable longitudinally of the round bars 6 by means of the screws 8 which have threaded engagement with the lower ends of these brackets 7, but have their end portions rotatably mounted in brackets 9 and 10, the two screws being connected together by a sprocket-chain 11, whereby rotation of one screw will rotate the other and cause the bracket bearings 7 to be adjusted in unison. At the other ends of the bars 6, there are similar bracket bearings 12, adjustable by similar screws 13 and sprocket-chain 14, in a manner which will be readily understood. These bracket bearings 7 and 12 are preferably supported on the floor by legs 15 rigid with said bracket bearings and provided at their lower ends with wheels 16 adapted to rest on the floor. Transverse and horizontally disposed shafts 17 and 18 rotate in the upper ends of the bracket bearings 7 and 12 for a purpose that will hereinafter be more fully explained. A bracket bearing 19 is mounted on the base 1, while a bracket support 20 is mounted on the outer side of pedestal 2, and an upright bracket support 21 is mounted on the shorter end portions of the bars 4, in the manner shown. Brackets 22 and 23 support the channel guides 24, which latter extend longitudinally of the machine, in the manner shown, these guides being set down a distance into the upper edge portions of the bars 4, as shown more clearly in Fig. 13 of the drawings. Said brackets 22 and 23 are supported on the rods or round bars 6, and in turn support horizontally disposed flat transverse bars 25, and the bars 4 and 25 in turn support the flat table plates 26 and 27, which have the angle guide bars 28 disposed thereon to form guides for the carton blanks, as will hereinafter more fully appear.

Suitable sprocket-wheels 29 are suitably fastened on the shaft 17, and similar wheels 30 are fastened on the shaft 18, as shown. Sprocket-belts or feed-chains 31 and 32 are mounted on said sprocket-wheels to travel longitudinal of the machine, between the previously mentioned longitudinally extending frame-bars 6, thereby to feed the carton blanks into position for stapling, as will hereinafter more fully appear. For the operation of these feed belts, a horizontal and transversely disposed shaft 33 is supported in bearings on the pedestal 2 and bracket 19 and provided with a gear 34 for engaging the gear 35 on the short lower shaft 36, which latter is supported in bearings on the bracket 19 and the bracket 37 adjacent thereto on the base of the machine. The shaft 36 is also provided with a sprocket-wheel 38, while the shaft 17 is provided with a sprocket-wheel 39, and a similar sprocket-wheel 40 is supported by an adjustable bracket bearing 41 on one of the rods or round bars 6, previously mentioned. A sprocket-chain 42 connects the sprocket-wheels 38, 39 and 40 together in the manner shown, while a belt-tightener 43 is suitably supported by a bracket 44 to engage the upper run of the sprocket-chain or belt 43, thereby to keep the latter tight. An electric motor, or other motive power, 45 is suitably supported on the pedestal 2, while a shaft 46 is suitably mounted in bearings on the elbow portion of the arm 3 and the bracket support 21, previously mentioned. The shaft 46 is provided with a sprocket-wheel 47, and this sprocket-wheel is connected by a sprocket-belt 48 with the sprocket-wheel 49 on the motor shaft, whereby the shaft 46 is driven by the motor. A sprocket-wheel 50 is suitably supported by the previously mentioned bracket support 20, as shown in Figs. 6 and 7 of the drawings, while a small sprocket-wheel 51 is mounted on the shaft 46 and connected by a sprocket-belt 52 with the sprocket-wheel 50, previously mentioned, an ordinary belt-tightener 53 being provided in position to engage the sprocket-belt 52 for the purpose of keeping the latter tight. A pinion 54 is rigid with the sprocket-wheel 50, rotates in unison therewith, and is disposed in position to engage the gear-wheel 55 fixed on the end of the shaft 33, previously mentioned. With this arrangement, therefore, the said motor 45 thereby drives the shaft 33, and this in turn drives the feed-belts 31 and 32, previously mentioned. The said feed-belts are provided with feed-blocks 56 for feeding the carton blanks through the machine, these feed-blocks being preferably formed like the one shown in Fig. 5, to receive and hold the rear edge of each carton blank, so that the blanks will be fed to the left in Fig. 5 of the drawings, and to the left of Fig. 1 of the drawings, as indicated by the arrows 57 in the latter figure of the drawings.

Looking at Figs. 15, 17, 18, 20, 21 and 22 of the drawings, it will be seen that the cartons are each formed from a blank of the kind shown in Fig. 20, each blank comprising side-wall sections 58, 59, 60, 61, a relatively narrow flap section 62, and end flaps 63, 64, 65 and 66, the blank being formed from pulpboard or fiberboard or pasteboard, or any suitable material through which staples can be inserted or driven. When the blank is folded longitudinally into the flat condition shown in Fig. 21, and as shown in Fig. 15, the longitudinal row of staples 67 is then inserted through the outer longitudinal flap 62 and through the adjacent edge portion of the side section 58, whereby a sort of tube is formed, rectangular in cross-section, as shown in Fig. 22 of the drawings. It will also be seen that the extra staples 68, one beside each end of the said row of staples, are driven to reinforce the end portions of the overlap thus formed by the flap 62 and the adjacent edge portion of the side section 58, thereby to strengthen the carton. At this time, the flaps 63, 64, 65 and 66 are left open, as shown in Fig. 22 of the drawings, whereby the carton can afterward be filled and then closed in any suitable or desired manner.

If desired, the stapling mechanism, hereinafter described, can be so controlled that only the staples 67 will be driven, as shown in Fig. 17, and the staples 68 omitted; or, on the other hand, as will hereinafter more fully appear, the stapling mechanism can be controlled automatically to drive a full row of the staples 68, beside the row of staples 67, as shown in Fig. 18 of the drawings.

The stapling mechanism 69, and the devices for the operation thereof, as well as the instrumentalities for the automatic control thereof, thereby to either drive or omit, or partially omit, the staples 68, will now be described. In the first place, it will be seen that the stapling mechanism 69 is suitably mounted on the end of the arm 3, previously mentioned, directly over the longitudinal path of travel of the overlap formed by the flap 62 and the adjacent attached edge portion of the section 58 of each of the blanks.

The stapling mechanism may be of any suitable form or character and, as shown, comprises a staple-former 70 and a staple-driver 71 which co-operate in the well known manner to cut off the wire and bend the same into staple form, and then drive the staple. In this particular case, the staple-former and staple-driver are made double, so to speak, so that two staples can be formed and driven simultaneously, wherever a pair of staples is desired, as shown in Figs. 15, 18 and 22. The staple-former and driver are normally latched together by the latch 72, in the well known manner, but are unlatched when the latch strikes the stationary cam shoulder 73 on the housing of the mechanism, whereby the staple-former can stop when it reaches the work, while the staple-driver can continue its downward movement to insert the staple or staples. A spring connection 74 is provided between the driver and the former, the spring of which is compressed while the driver is moving downward relatively to the former, and while the former is stationary, thereby to maintain sufficient pressure on the former to hold it firmly against the work. The loop bar or anvil 75, over which the wire is bent into staple form, by the staple-former, is pivoted at 76 and provided with a cam portion 77 for engaging the cam 78 on the back of the staple-driver, thus holding the anvil in operative position to bend the wire until the cam 78 passes downward and out of engagement with the cam portion 77, thereby allowing the anvil to swing down and out of the way of the staple-former, so that the latter can continue its downward movement to insert the staple or staples. The stapler head or housing 79 is mounted on the end of the sleeve 80, which oscillates, as will hereinafter more fully appear, about a horizontal axis within the arm 3, previously mentioned.

The wire feeding mechanism 81 comprises ordinary feed rolls 82, 83 and 84, mounted on the shaft 85, and on the shafts 86 and 87, and these rolls are geared together by the gears 88 and 89, as shown in Figs. 8 and 9 of the drawings. The shafts 86 and 87 have eccentric end portions 90 and 91 upon which the rolls 83 and 84 are mounted, and these shafts can be rocked to thereby disengage their feed rolls from the wire, thereby causing the feeding movement of either one or both of the wires to stop, so that no staples will be formed at predetermined points, notwithstanding that the machine continues running with the stapling mechanism in operation. For this purpose, the shafts 86 and 87 are provided with arms 92 and 93, having adjustable screws 94 and 95 which bear against the cams 96 and 97 on the shafts 98 and 99. The shafts 86 and 87 are also provided with arms 100 and 101, which are connected by springs 102 and 103 with the pins 104 and 105 on the housing of the feed mechanism. The shafts 98 and 99 can be rocked to control the cams 96 and 97, thereby to oscillate the shafts 86 and 87 to control the driving of the staples, or the omission of staples wherever they are not desired, and for this purpose, these shafts are provided with arms 106 and 107, which are connected by links 108 and 109 with the bell cranks 110 and 111, respectively, both bell cranks being pivoted at 112 on a movable support, as hereinafter set forth. A staple controller 113 is pivoted at 114 on a suitable stationary portion of the machine, adjacent the link belt 31, while a similar stapler controller 115 is pivoted at 116 on a suitable stationary portion of the machine, adjacent the link belt 32, as shown more clearly in Fig. 4 of the drawings. The controller 113 is connected by a rod 117 with the bell crank 111, and a similar rod 118 connects the controller 115 with the bell crank 110. Cam blocks 119 on the link belt 31 actuate the controller 113, while similar cam blocks 120 actuate the controller 115, when the chains or link belts are traveling in the direction indicated in Fig. 16, it being observed that the feeding motion of those link belts is continuous, whereby to rock the shafts 98 and 99, as previously explained, thereby to control the feeding of the staple wire, to prevent the driving of staples between blanks, as the blanks pass successively through the machine, and also to automatically control the driving of the staples 68 in the desired manner. The staples 68 are only driven where the blocks 120 occur, as it requires one of these blocks to render the feed for the wire, from which the staples 68 are made, operative; but wherever a block 119 occurs, no staples 67 will be driven whatever. As shown in Figs. 15 and 16, the staples 67 and 68 will be driven at the points indicated; but if it is desired to drive the staples as shown in Fig. 18, then more blocks 120 will be added, to cause the driving of a full row of the staples 68; or, instead of adding any blocks 120, a link 121 can be introduced between the arms 122 and 123 on the shafts 98 and 99, whereby the latter will be actuated each time that the shaft 98 is actuated.

In as much as the feeding motion of the blanks is continuous, and not intermittent, it follows that the stapling mechanism must move a short distance with the work, so that the staples will be properly inserted. For this purpose, the oscillatory sleeve 80 is provided with an arm 124, which is in turn connected by a link 125 with an adjustable bracket 126 (which carries the pivot 112) on the arm 127, which latter is pivoted at 128 on any suitable stationary portion of the frame of the machine. An eccentric device 129 is mounted on the shaft 46, previously mentioned, and this eccentric device is connected by a rod 130 with the arm 127, whereby the latter is automatically moved up and down, thereby to cause the sleeve 80 to oscillate the stapling mechanism back and forth, in timed relation to the feeding motion of the blanks. To clinch the staple points, a bar 131 is provided, mounted on the slide block 132, which latter is slidable on the bracket support 133, this bar 131 having a clinch block 134 in position to receive and clinch the points and staples. A roller 135 is provided to form a support for the clinch block, this roller being mounted on a vertically adjustable support 136, which latter is movable up and down by the wedge block 137, which block is connected by a rod 138 with the rotary screw-threaded handle 139, by which latter said rod and wedge can be moved endwise to raise and lower the roller 135, in a manner that will be readily understood. The slide block 132 has a lever connection 140 with a link 141, which is pivoted on the upper portion of the stapling housing at 142, whereby the oscillation of the stapling mechanism will cause a back-and-forth movement of the slide block 132 and the consequent back-and-forth movement of the clinch block 134 in unison with the lower end of the stapling mechanism, whereby the clinch block will always be in correct position to clinch the points and staples. The blanks are partially folded by hand and are guided in partially folded condition below the stapling mechanism by the upper guide 143, and by the flexible bar 131, previously mentioned, as shown more clearly in Figs. 12, 13, 14 and 21, it being observed that the section 58 of the blank rests upon the guide 144, being pressed down by the guide 143 above; and it will also be seen that the sections 61 and 62 of the blank rest upon the upper surface of the bar 131, while the other portions of the blank are below this bar 131 and travel on the table 145 and over the roller 135, previously mentioned. A stationary bracket 146 is supported in the bracket arm 133, in position to support the guides 147, 148, and 149, as shown. The guides 147 and 148 are formed of two plates or sheets merged together at one end and spaced apart at the other end to telescopically engage with and permit the reciprocation of the guide 144 and bar 131 respectively. The rear end 150 of the guide 147 is bent upwardly to facilitate the entrance of blanks therein. Looking at Fig. 12, it will be seen that the section 58 of the blank rests on the guide 147 as it begins to pass under the guide 143, while the sections 61 and 62 slide forward between the guides 147 and 148, and in this way the blank is finally folded, as shown in Fig. 13, to bring the overlapping portions in position to receive the staples.

The guides 28 can be made laterally adjustable, to accommodate blanks of different sizes, by providing slots 151 in the tables, for the bolts 152, by which the guides are held in place. All of the blocks on the feed belts are adjustable, and detachable, in any suitable or desired manner, so that they can be placed wherever necessary, and thus the blanks can vary in length as well as in width, as the machine is adjustable to receive and operate upon blanks of different widths or different lengths, whereby cartons, with their ends still open, as shown in Fig. 22, of different sizes, can be produced on this machine.

As shown in Figs. 2 and 3, there are means provided for adjusting the feed to keep it in step with the stapling mechanism, said means comprising a disk 153 rigid with the sprocket 39 for the belt 42, and another disk 154 which is keyed on the shaft 17, previously mentioned. The disk 153 and the sprocket 39 are loose on said shaft. The disk 153 is provided with a circular row of holes 155, and the disk 154 is provided with a similar row of holes 156, but the holes in one disk do not coincide with those of the other disk, as shown in Fig. 3 of the drawings. A coupling pin 157 is provided, to couple the two disks together, whereby the driving belt 42 will be operative to rotate the shaft 17, and thus operate the means for feeding the blanks successively under the stapling mechanism. If the feed does not seem to be just right, for example, after the feed blocks and cam blocks have been adjusted for a different length of blank, then by withdrawing the coupling pin 157 and then inserting it in different holes, after some relative adjustment between the two disks, the feed can be adjusted in step with the stapling mechanism.

Thus, a machine is provided in which partially folded carton blanks are fed automatically and successively, below the stapling mechanism, so that each partially folded blank is stapled to permanently connect together the overlapping side portions of the blank, thus converting each blank into a tube that is rectangular in cross section, or polygonal in cross section. Means are provided and controlled by the blank feeding means to automatically control the stapling mechanism and thereby prevent the driving of staples at different points in the work, and prevent the making and discharge of any staples from the stapling mechanism between blanks,—all in a machine that is adjustable in various ways, as previously stated, and in which the product is a hollow carton or container having overlapping side wall portions that are stapled together.

The stapling mechanism can be operated in any suitable or desired manner, of course, but, as shown in the drawings, it is operated by a crank disk 158, keyed on the end of the shaft 46 and provided with link connection 159 with the staple-driver 71, whereby the mechanism is reciprocated in the well understood manner.

The wire feeding mechanism can be operated in any suitable or desired manner, as by gears 160, 161 and 162, whereby power is communicated from the shaft 46 to the shaft 85 of the wire feeding mechanism.

Furthermore, the speed of the blank feeding means, the feed belts 31 and 32, can be changed by taking off the pinion 54 and putting on either a larger or a smaller one, thereby to vary the spacing between the staples, so that the staples may be driven in a row in which the spaces are either greater or less, as may be required. For this purpose, the bracket bearing 163 is adjustable on the rigid support 164, in any suitable or desired manner, thereby to accommodate pinions 54 of either greater or less size, in proper engagement with the gear 55, thereby changing the gear ratio to change the speed of the blank feeding means. The link belts 31 and 32 can be lengthened for longer blanks by inserting additional links, and the bracket bearings 7 and 12 are then adjusted accordingly.

Looking at Figs. 15, 17, 18, 22 and 23, it will be seen that the staples are so driven that their heads are parallel with the path of travel of the work, being parallel with the feed belts 31 and 32, previously described. Thus, the heads of the staples 67 are parallel with the heads of the staples 68, as shown.

In operation, the attendant stands close enough to insert the blanks in the notches of the feed dogs 56, the operator or attendant partially folding each blank before it is moved forward into the guides 143 and 144, and under the bar 131, so that each blank is delivered in properly folded condition to the stapling position below the stapling head. The staples are all driven while the work is actually in motion, but this does not interfere with the proper driving of the staples, inasmuch as the stapling head is moving in unison with the work, for a short distance, during the actual insertion of each staple. As soon as a staple is driven, or a pair of staples, the stapling head then swings back into position to again perform a stapling operation, and to then swing forward while performing the stapling operation. In this way, the feeding of the blanks is continuous, and is smooth and not jerky, and hence the machine can be speeded up to capacity, without danger of improperly stapling the blanks.

What I claim as my invention is:

1. A machine for making cartons or hollow containers, said carton or container being polygonal in cross section and having overlapping side wall portions stapled together, comprising stapling mechanism for inserting staples successively in said overlapping portions, blank feeding means for feeding the blanks from which the cartons or containers are made, in partially folded condition, whereby the blanks are given a uniform continuous feeding motion, while receiving the the staples, without changing said motion between blanks, guiding means for holding said overlapping side wall portions in proper lapping relation to receive the staples from said mechanism, means preventing any lateral displacement of the blanks while passing through the machine, and instrumentalities for operating said mechanism and said blank feeding means in properly timed relation to cause the successive insertion of staples through said overlapping side wall portions.

2. A structure as specified in claim 1, said blank feeding means having a continuous feeding motion, and said stapling mechanism being oscillatory to move a distance with the work during the insertion of each staple.

3. A structure as specified in claim 1, comprising a flexible bar forming part of said guiding means, supported at one end only, the other end of said bar being free to move up and down below the stapling mechanism, said bar in effect passing through the interior of each carton or container, and the free end of said bar having means to clinch the points of the staples, together with supporting means below said free end of the bar to support the work for said uniform motion, whereby the blanks are supported for the same feeding motion while being stapled and before and after being stapled.

4. A structure as specified in claim 1, comprising a flexible bar forming part of said guiding means, supported at one end only, the other end of said bar being free to move up and down below the stapling mechanism, said bar in effect passing through the interior of each carton or container, and the free end of said bar having means to clinch the points of the staples, together with supporting means below said free end of the bar to support the work for said uniform motion, whereby the blanks are supported for the same feeding motion while being stapled and before and after being stapled, and manually operable means for adjusting said supporting means up and down.

5. A structure as specified in claim 1, comprising a flexible bar forming part of said guiding means, supported at one end only, the other end of said bar being free to move up and down below the stapling mechanism, said bar in effect passing through the interior of each carton or container, and the free end of said bar having means to clinch the points of the staples, together with supporting means below said free end of the bar to support the work against the pressure of the stapling mechanism, said supporting means being a rotary member to bear against the under side of the blank, being freely rotative to permit free forward movement of the work thereon.

6. A structure as specified in claim 1, said feeding means also having a continuous feeding motion, in unison with said continuous feeding motion of the blanks, and said mechanism being oscillatory to move a distance with the work each time a staple is inserted, in combination with means for adjusting the feeding means in step with said stapling mechanism.

7. A structure as specified in claim 1, in combination with devices controlled by the said uniform motion feeding means to automatically control the action of said stapling mechanism, thereby to prevent the forming and discharging of staples from said mechanism in the spaces between the blanks.

8. A structure as specified in claim 1, in combination with devices controlled automatically by said uniform motion feeding means to automatically control the action of said stapling mechanism, thereby to insure the insertion of the proper number of staples at pre-determined points in the work.

9. A structure as specified in claim 1, in combination with devices controlled by the said feeding means to automatically control the action of said stapling mechanism, thereby to prevent the forming and discharging of staples from said mechanism in the spaces between the blanks, said stapling mechanism having wire feeding means controlled by said devices, thereby insuring against feeding of the wire when staples are not desired, while permitting the stapling mechanism to continue in motion.

10. A structure as specified in claim 1, in combination with devices controlled automatically by said feeding means to automatically control the action of said stapling mechanism, thereby to insure the insertion of the proper number of staples at pre-determined points in the work, said stapling mechanism having wire feeding means controlled by said devices, thereby insuring against feeding of the wire when staples are not desired, while permitting the stapling mechanism to continue in motion.

11. In a stapling machine, feeding means for automatically feeding the work, having continuous feeding motion, stapling mechanism disposed in position to insert staples in the work, an oscillatory sleeve for supporting said mechanism, a stationary support in which said sleeve is free to oscillate, so that the stapling mechanism may move a distance with the work, each time a staple is inserted, a shaft in said sleeve for operating said stapling mechanism, thereby to cause said mechanism to insert the staples in such manner that the head of each staple is disposed parallel with the path of travel of the work, means for operating said shaft, and eccentric means for oscillating said sleeve.

12. In a stapling machine, the combination of feeding means for automatically feeding the work, stapling mechanism mounted to oscillate about an axis between its upper and lower ends, whereby the bottom of said mechanism moves forward with said feeding means, while the top of said mechanism is moving backward, instrumentalities for operating said feeding means and said stapling mechanism in timed relation, and staple clinching means movable back and forth with said bottom by said top.

13. A structure as specified in claim 12, comprising devices controlled automatically by said feeding means to in turn automatically control the action of said stapling mechanism.

14. A structure as specified in claim 12, said feeding means having continuous feeding motion, and said stapling mechanism being oscillatory to move a distance with the work each time a staple is inserted.

15. A structure as specified in claim 12, said mechanism being operative to drive a plurality of staples at the same time, having wire feeding means for feeding the staple wire parallel with the path of travel of the work.

16. A structure as specified in claim 12, said mechanism being operative to drive a plurality of staples at the same time, having a wire feeding means for feeding the staple wire parallel with the path of travel of the work, in combination with devices controlled automatically by said feeding means to automatically control said wire feeding means, thereby to cause a cessation of the feeding of the wire without stopping the motion of the stapling mechanism.

17. A structure as specified in claim 12, said feeding means being adjustable for carton or container blanks of different sizes, together with means to adjust the feeding motion in step with the stapling mechanism to insure the desired placing of the staples in said blanks.

18. In a machine for stapling blanks, the combination of feeding means for continuously feeding the materials, a reciprocating blade for insertion between the flaps of said blanks, driving means operative for continuously operating said feeding means, without stopping between blanks, and stapling mechanism, together with an adjustable device interposed between said driving means and said feeding means to permit the adjustment of said feeding means in step with the stapling mechanism, to insure driving the staples at pre-determined points in said blanks, and controlled means operated at predetermined intervals by said adjustable feeding means to periodically prevent stapling but without stopping the machine.

19. A structure as specified in claim 18, said device comprising a pair of disks having holes therein, the holes of one disk being more or less out of alignment with the holes of the other disk, and a coupling pin for insertion through said holes to couple the disks together to communicate power from said driving means to said feeding means.

20. In stapling machinery, the combination of staple forming and driving devices, a crank, a link connecting said crank to said devices, the link being disposed flatwise between the crank and the staple driver, whereby said devices are reciprocated by the rotation of the crank, a rotary shaft to one end of which said crank is fixed, means for operating said crank, means including an automatically oscillated sleeve on said shaft for oscillating the devices about the axis of said crank, and a work support for holding the work in position to travel a distance with and be operated upon by said devices.

21. A structure as specified in claim 20, said work support comprising work feeding means having continuous motion, said devices being movable about the axis of said crank, whereby the upper end of the staple driver moves in one direction about said axis while its lower end is moving the opposite direction.

22. A structure as specified in claim 20, said work support comprising work feeding means having continuous motion, said devices being movable about the axis of said crank, whereby the upper end of the staple driver moves in one direction about said axis while its lower end is moving the opposite direction, and means whereby said staple forming and driving devices move a distance with the continuously moving work each time a staple is driven therein.

23. A structure as specified in claim 20, said work support having continuous feeding motion, said oscillatory motion permitting said devices to move a distance with the continuously moving work each time a staple is driven therein.

24. A structure as specified in claim 20, said work support having continuous feeding motion, in combination with a staple clinching device mounted to move back and forth with the lower end of said devices, in a straight line, an oscillatory casing for said staple forming and driving devices, and link connection between said clinching device and the upper end of said casing.

25. In stapling mechanism, the combination of a stapler mounted to swing or oscillate about a horizontally disposed axis, means operative in a direction at right angles to said axis to feed the materials to be stapled continuously, a clinch block disposed in position to clinch the staples on the under side of the materials, and means having horizontal sliding motion to reciprocate said clinch block horizontally, parallel with said feed means, whereby both the stapler and the clinch block move forward a distance with the materials each time a staple is inserted.

26. A machine for making cartons or hollow containers, said carton or container being polygonal in cross section and having overlapping side wall portions stapled together, comprising stapling mechanism, blank feeding means for feeding the blanks from which the cartons or containers are made, in partially folded condition, guiding means for holding said overlapping side wall portions in proper lapping relation to receive the staples from said mechanism, and instrumentalities for operating said mechanism and said blank feeding means in properly timed relation to cause the insertion of staples through said overlapping side wall portions, said blank feeding means having a continuous feeding motion, and said stapling mechanism being oscillatory to move a distance with the work during the insertion of each staple.

27. A machine for making cartons or hollow containers, said carton or container being polygonal in cross section and having overlapping side wall portions stapled together, comprising stapling mechanism, blank feeding means for feeding the blanks from which the cartons or containers are made, in partially folded condition, guiding means for holding said overlapping side wall portions in proper lapping relation to receive the staples from said mechanism, and instrumentalities for operating said mechanism and said blank feeding means in properly timed relation to cause the insertion of staples through said overlapping side wall portions, comprising a flexible bar forming part of said guiding means, supported at one end only, the other end of said bar being free to move up and down below the stapling mechanism, said bar in effect passing through the interior of each carton or container, and the free end of said bar having means to clinch the points of the staples, together with supporting means below said free end of the bar to support the work against the pressure of the stapling mechanism, said supporting means being a rotary member to bear against the under side of the blank, being freely rotative to permit free forward movement of the work thereon.

28. A machine for making cartons or hollow containers, said carton or container being polygonal in cross section and having overlapping side wall portions stapled together, comprising stapling mechanism, blank feeding means for feeding the blanks from which the cartons or containers are made, in partially folded condition, guiding means for holding said overlapping side wall portions in proper lapping relation to receive the staples from said mechanism, and instrumentalities for operating said mechanism and said blank feeding means in properly timed relation to cause the insertion of staples through said overlapping side wall portions, said feeding means having a continuous feeding motion, and said mechanism being oscillatory to move a distance with the work each time a staple is inserted, in combination with means for adjusting the feeding means in step with said stapling mechanism.

29. A machine for making cartons or hollow containers, said carton or container being polygonal in cross section and having overlapping side wall portions stapled together, comprising stapling mechanism, blank feeding means for feeding the blanks from which the cartons or containers are made, in partially folded condition, guiding means for holding said overlapping side wall portions in proper lapping relation to receive the staples from said mechanism, and instrumentalities for operating said mechanism and said blank feeding means in properly timed relation to cause the insertion of staples through said overlapping side wall portions, in combination with devices controlled by the said feeding means to automatically control the action of said stapling mechanism, thereby to prevent the forming and discharging of staples from said mechanism in the spaces between the blanks, said stapling mechanism having wire feeding means controlled by said devices, thereby insuring against feeding of the wire when staples are not desired, while permitting the stapling mechanism to continue in motion.

30. A machine for making cartons or hollow containers, said carton or container being polygonal in cross section, and having overlapping side wall portions stapled together, comprising stapling mechanism, blank feeding means for feeding the blanks from which the cartons or containers are made, in partially folded condition, guiding means for holding said overlapping side wall portions in proper lapping relation to receive the staples from said mechanism, and instrumentalities for operating said mechanism and said blank feeding means in properly timed relation to cause the insertion of staples through said overlapping side wall portions, in combination with devices controlled automatically by said feeding means to automatically control the action of said stapling mechanism, thereby to insure the insertion of the proper number of staples at pre-determined points in the work, said stapling mechanism having wire feeding means controlled by said devices, thereby insuring against feeding of the wire when staples are not desired, while permitting the stapling mechanism to continue in motion.

31. In a stapling machine, the combination of feeding means for automatically feeding the work, stapling mechanism disposed in position to insert the staples in such a manner that the head of each staple is parallel to the path of travel of the work, and instrumentalities for operating said feeding means and said stapling mechanism in timed relation, said mechanism being operative to drive a plurality of staples at the same time, having wire feeding means for feeding the staple wire parallel with the path of travel of the work, in combination with devices controlled automatically by said feeding means to automatically control said wire feeding means, thereby to cause a cessation of the feeding of the wire without stopping the motion of the stapling mechanism.

32. In stapling machinery, the combination of staple forming and driving devices, a crank, a link connecting said crank to said devices, whereby said devices are reciprocated by the rotation of the crank, means for operating said crank, and a work support for holding the work in position to be operated upon by said devices, said work support comprising work feeding means having continuous motion, said devices being movable about the axis of said crank, whereby the upper end of the staple driver moves in one direction about said axis while its lower end is moving the opposite direction.

33. In stapling machinery, the combination of staple forming and driving devices, a crank, a link connecting said crank to said devices, whereby said devices are reciprocated by the rotation of the crank, means for operating said crank, and a work support for holding the work in position to be operated upon by said devices, said devices being oscillatory about a horizontal axis, and said work support having continuous feeding motion, in combination with a staple clinching device mounted to move back and forth with the lower end of said devices, an oscillatory casing for said staple forming and driving devices, and a link connection between said clinching device and the upper end of said casing.

Specification signed this 25 day of July, 1929.

WALTER F. NEWHOUSE.